INVENTORS
CARL O. CARLSON
HERBERT L. BERNSTEIN
ELIOT STONE

BY
THEIR ATTORNEYS

Sept. 2, 1969   C. O. CARLSON ET AL   3,465,352
INFORMATION PROCESSING SYSTEMS USING LASERS
Filed May 11, 1966   3 Sheets-Sheet 2

INVENTORS
CARL O. CARLSON
HERBERT L. BERNSTEIN
ELIOT STONE

BY *Louis A. Kline*
*John J. Maclage*
*Nathan Cass*
THEIR ATTORNEYS

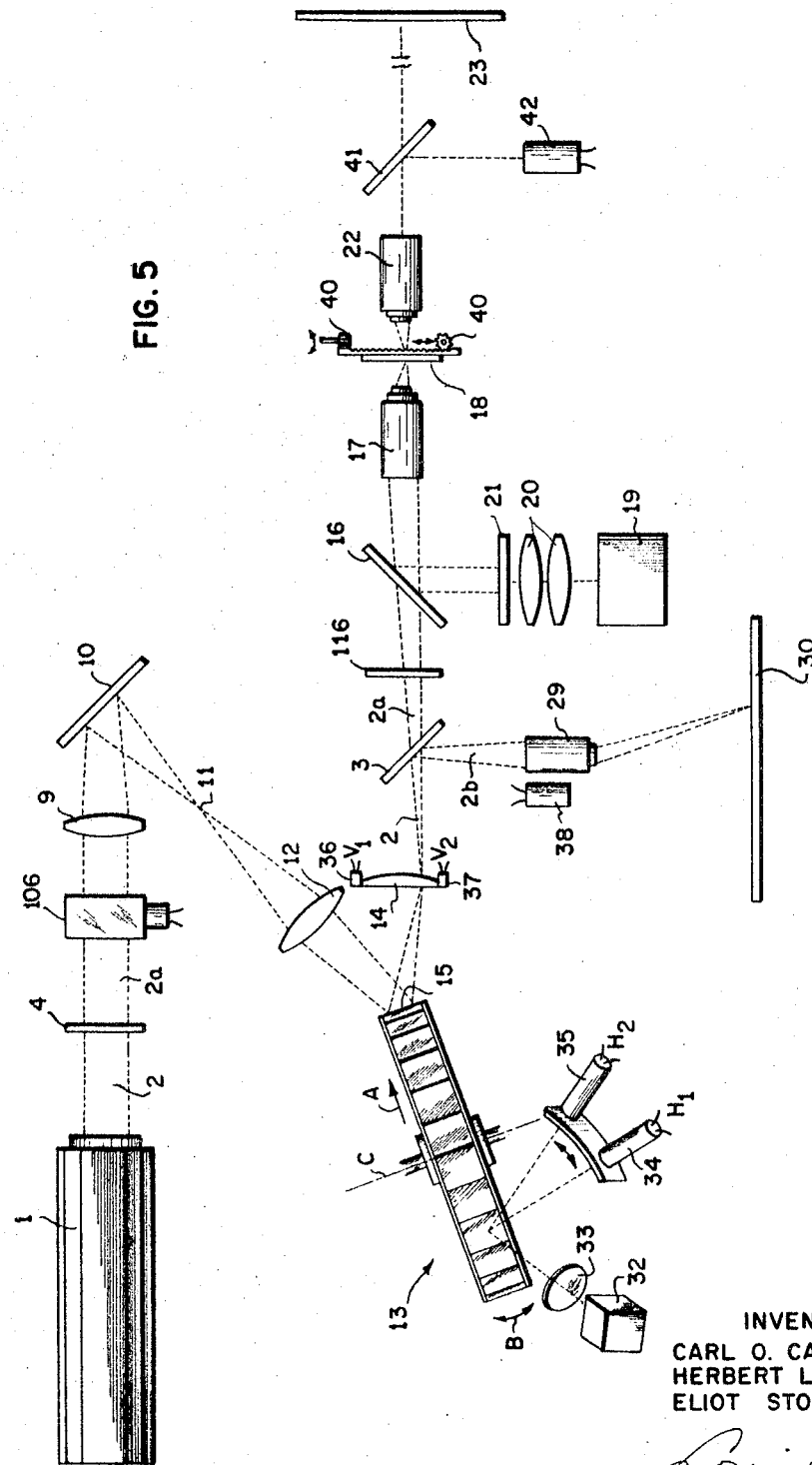

United States Patent Office 3,465,352
Patented Sept. 2, 1969

3,465,352
INFORMATION PROCESSING SYSTEMS USING LASERS
Carl O. Carlson, Los Angeles, Herbert L. Bernstein, Gardena, and Eliot Stone, Los Angeles, Calif., assignors to The National Cash Register Company, Dayton, Ohio, a corporation of Maryland
Filed May 11, 1966, Ser. No. 549,281
Int. Cl. G01d 15/10
U.S. Cl. 346—76
27 Claims

ABSTRACT OF THE DISCLOSURE

A record system in which a beam of coherent radiation is optically formed into an intense spot which is deflected according to a field scan and made to impinge upon a sensitive recording surface, and in which the recording is similarly scanned by a spot of reduced intensity for read out. A laser generates the beam which is spot-focused by a triple-lens system, the spot being deflected in a field scan pattern by a rotating and oscillating mirrored polygon located between two of the lenses, and the record is made by decolorization of a film deposited on a substrate. Also included are a projection system for display, rack and pinion positioning to select a portion of the record medium to be recorded or sensed, and photoelectric and optical systems, the latter utilizing the above polygon to field scan a document, to provide signal input to a polarization-type intensity modulator for the beam.

---

This invention relates generally to information recording, processing and reproducing systems and component portions thereof, and more particularly to such systems employing lasers and laser beams.

Accordingly, it is a broad object of this invention to provide new and improved systems and component portions thereof in which lasers and/or laser beams are employed in a novel manner.

Another object of this invention is to provide improved means and methods for recording information at ultra-high resolutions.

A further object of this invention is to provide, in accordance with one or more of the foregoing objects, improved means and methods for recording information without requiring the formation of a talent image.

Yet another object of this invention is to provide, in accordance with one or more of the foregoing objects, improved means and methods for recording and recovering information at high speeds.

A still further object of this invention is to provide an ultra-high resolution microimage recording or storage system in which information can be applied to the system in coded form (such as from a computer), or as a result of the scanning of a full size object, without the necessity of forming intermediate photographic or other reduced images.

Yet another object of this invention is to provide means and methods for use with ultra-high resolution microimage recording or storage systems for recovering or reproducing the recorded or stored information.

A further object of this invention is to provide a novel real-time laser display system.

Another object of this invention is to provide a high density digital laser recording and reproducing system.

Still another object of this invention is to provide a real-time laser oscillograph or facsimile recorder.

A still further object of this invention is to provide improved means for making an integrated mask or circuit using a laser.

An additional object of this invention is to provide, in accordance with one or more of the foregoing objects, improved recording mediums and materials for use in laser recording and reproducing systems.

Briefly, in a typical embodiment of the invention, a laser microimage recording system is provided in which the output of a laser is efficiently reduced to a spot size of 2 microns or less for recording of a microimage having the remarkable resolution of better than 1500 scan lines in fields of 3 millimeters by 3 millimeters or less directly from a full size object without requiring the formation of a latent image, and without requiring the forming of any intermediate photographic or other reduced images.

The specific nature of the invention as well as other objects, advantages, and uses thereof will become apparent from the following description and the accompanying drawings in which:

FIG. 5 is a partially schematic side view of a simplified embodiment of the system of FIG. 1.

Like numerals designate like elements throughout the figures of the drawings.

Figure 1:
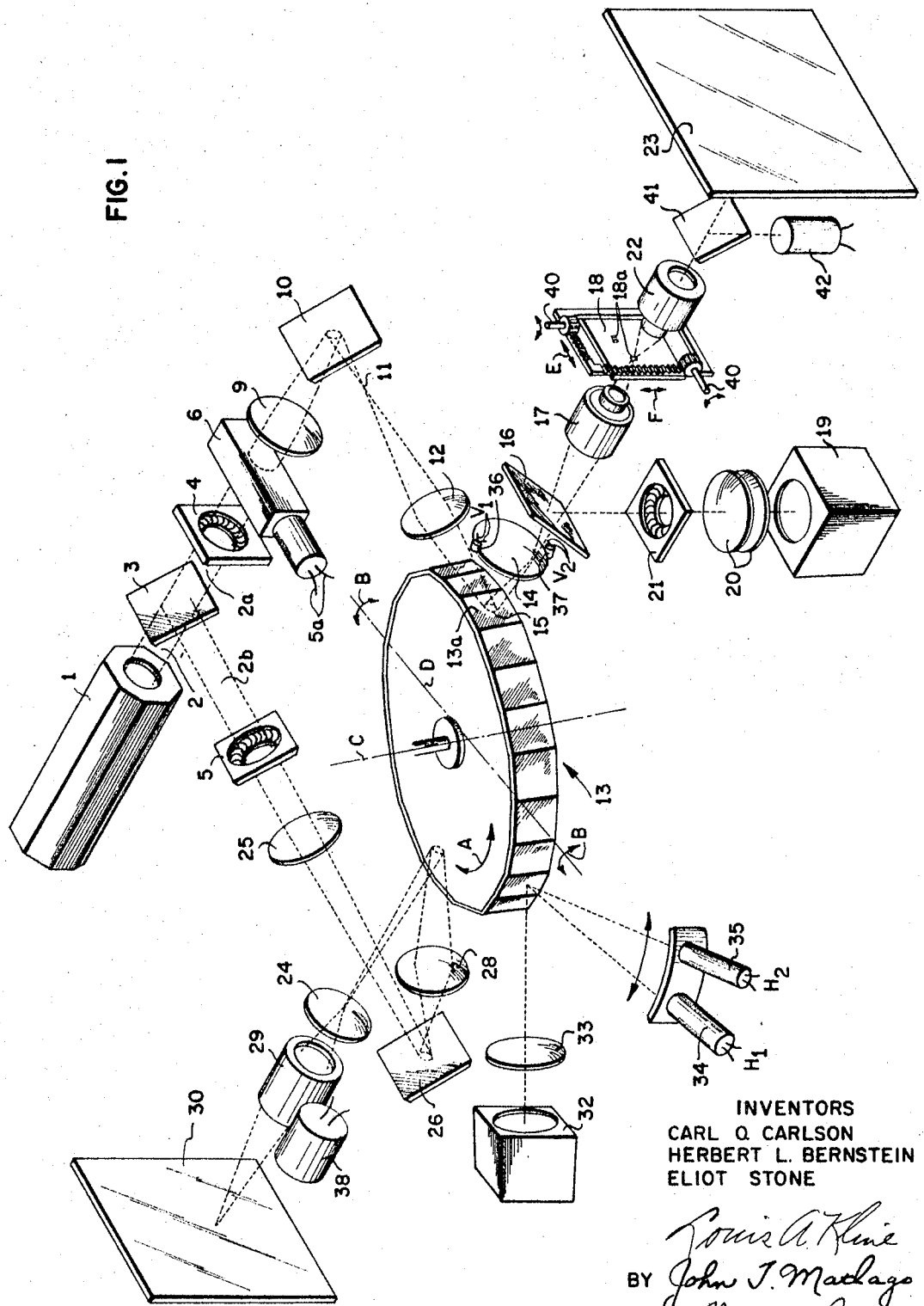
FIG. 1 is a pictorial, partially schematic view of a typical embodiment of the invention.

Referring to FIG. 1, illustrated therein is a typical embodiment of a system for recording, reading, and/or displaying high resolution microimage data which takes advantage of the properties of lasers in a novel manner.

The laser in FIG. 1 is identified by the numeral 1 and may typically be a conventional continuous-wave laser oscillating in a single transverse mode and emitting a uniphase wavefront laser beam with a divergence which is preferably substantially diffraction limited so as to permit optimum use of the laser power output. An available laser of this type is a Model 125 helium-neon gas laser manufactured by Spectra-Physics, Inc., of Mountain View, Calif., having a power output of approximately 50–70 milliwatts, a wavelength of 6328 angstroms, and a beam divergence of approximately 0.5 milliradian.

As illustrated in FIG. 1, laser 1 emits a high energy, collimated, monochromatic, linearly polarized output laser beam 2 which is incident on a beam splitter 3 for forming subsidiary laser beams 2a and 2b containing, typically 90 percent and 10 percent, respectively, of the energy of laser beam 2. In considering the system of FIG. 1, it is to be understood that the components therein are located so that all laser beams along the optical axes are in the same vertical plane.

Initially, only laser beam 2a which is used for recording will be considered. Laser beam 2a passes through a shutter 4 to an ampitude modulator 6, which may be of conventional form. For example, modulator 6 may comprise a Pockels cell, which rotates the plane of polarization of the beam 2a in response to a signal applied to modulator input terminals 5a, in combination with an analyzer which converts the change in polarization to amplitude modulation. Shutter 4 and other shutters in the system to be described later on herein, are provided to permit separate as well as combined use of various portions of the system.

The resultant modulated laser beam at the output of modulator 6 passes to spot forming lens 9, which focuses the beam to a spot 11 after reflection from a mirror 10. A relay lens 12 refocuses spot 11 at the field lens 14 after reflection from one of the mirrored facets 13a of a scanning polygon 13, which provides the scanning motion for the system.

An indicated by arrows A and B in FIG. 1, well known means (not shown) are provided for causing the scanning polygon 13 to simultaneously rotate about axis C (arrow A) and oscillate about axis D (arrow B), so as to produce a resultant two-dimensional row-by-row scanning of the refocused spot at the field lens 14. Axis C is in the same vertical plane as that of the beams, while axis D is perpendicular thereto. Typically, photocells 36 and 37 may be disposed immediately above and below field lens 14 for the purpose of providing vertical synchronizing signals $V_1$ and $V_2$, indicating the beginning and end of each vertical frame of the scanning pattern at field lens 14. Horizontal synchronizing signals $H_1$ and $H_2$, indicating the beginning and end of each horizontal or row scan, may be provided using appropriately located photocells 34 and 35 which receive a beam of light produced by auxiliary light source 32 and lens 33 after reflection from the mirrored polygon 13. The photocells 34 and 35 are located so as to generate horizontal synchronizing signals $H_1$ and $H_2$ corresponding to the beginning and end of each row or scan.

Having described how a two-dimensional scanning raster is provided for the refocused laser beam spot at the field lens 14, and how corresponding vertical and horizontal synchronizing signals $V_1$, $V_2$, $H_1$ and $H_2$ may typically be provided, it will now be explained how the scanning pattern produced at the field lens 14 is transferred to the recording medium 18, via beam splitter 16 and recording lens 17. Since it is of considerable importance to obtain a high efficiency energy transfer to the recording medium 18, substantially all rays intercepted by the field lens 14 should be directed into and substantially fill the entrance pupil of the recording lens 17. However, the achieving of this important result is complicated by the scanning motion provided by scanning polygon 13. To overcome this difficulty, field lens 14 is designed and located so as to form an image of spot 15 at the entrance pupil of recording lens 17 and substantially matched to the size of the pupil, which spot 15 is the intersection of the beam from relay lens 12 with the polygon 13. By so imaging spot 15, the scanning motion at the entrance pupil of recording lens 17 is virtually eliminated, since spot 15 remains substantially fixed in space as polygon 13 goes through its scanning motion.

It is also important that the spot produced at the field lens 14 remain substantially in focus throughout the entire scanning field, despite the scanning motion of polygon 13. This is accomplished in a novel manner by directing the optical beam incident on polygon 13 toward the intersection of the C and D axes thereof, and by choosing the diameter of the circle circumscribing the polygon to be four times the separation between the field lens 14 and the mirrored surface of polygon 13 when normal to the optical axis and provided that the scan angle is not too large.

Continuing with the description of the system of FIG. 1, recording lens 17 is a conventional compound lens and is located and designed to form, on recording medium 18, a reduced image of the two-dimensional scanning pattern at the field lens 14. In order to obtain high resolution recording, it is important that recording lens 17 be able to produce a flat field so that the spot will be in focus at all points of the field produced at the recording medium. This is relatively easy to accomplish for the recording lens 17, since a laser emits monochromatic light, which eliminates the need for color correction. Also, in order to obtain a reduced, high resolution scanning pattern, the recording lens 17 should have a sufficiently high numerical aperture to be compatible with the desired reduction and resolution. By having field lens 14 image spot 15 on the polygon 13 at the entrance pupil of the recording lens 17, as already described, the design burden on the recording lens 17 is significantly reduced, since the recording lens diameter need not be made unnecessarily large to account for the scanning motion required to obtain a scanning pattern.

The above described system, in which each lens is itself conventional, provides a novel combination which is capable of converting, at high efficency, substantially the entire output of a laser into a highly reduced spot of 2 microns or less on the recording medium 18, which spot can be controllably scanned so as to form a two-dimensional row-by-row scanning pattern on the medium 18 having a flat field of, for example, 3 millimeters by 3 millimeters. Since substantially the entire laser output energy, aside from transmission losses and the energy diverted by the beam splitter, is converted to such a small spot, the laser energy per unit area applied to the recording medium 18 is unusually large. Accordingly, it becomes possible, by proper choice of the recording medium 18, to cause the highly reduced spot of 2 microns or less to effect a wide variety of reproducible changes in the recording medium 18, which is all the more valuable because the energy content of the spot can be amplitude modulated, as well as being controllably scannable to trace on medium 18, a high resolution two-dimensional pattern of, for example, 3 millimeters by 3 millimeters, for which the spot remains substantially in focus throughout the scanning field. Particularly advantageous recording mediums will be considered in detail later on herein.

Figure 2:
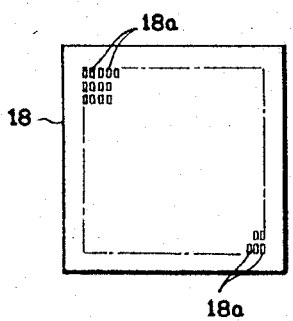
FIG. 2 illustrates a typical recording medium having a plurality of recording fields thereon.
Figure 3:
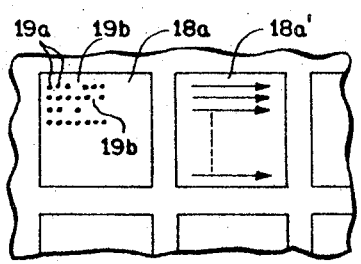
FIG. 3 is an enlarged fragmentary view of FIG. 2 illustrating a typical recording field containing binary digital data, and also illustrating the manner in which a recording field is scanned.

The remarkably hgh recording bit storage density capability of a system in accordance with the invention can be appreciated by reference to FIG. 2 which illustrates an exemplary 1.5 inch by 1.5 inch recording medium 18, having one-hundred recording fields 18a, such as illustrated in FIG. 3, each recording field 18a being approximately 3 millimeters by 3 millimeters, and each being capable of being scanned by a 2 micron spot as typically illustrated for recording field 18a' in FIG. 3. Each recording field 18a may typically store one million binary bits; for example, the presence of a recorded spot at a storage location, such as illustrated by numeral 19a in FIG. 3, may indicate one binary bit, and the absence of a recorded spot at a storage location, such as illustrated by numeral 19b in FIG. 3, may indicate the other binary bit. The size and spacings in FIG. 3 are exaggerated for the sake of clarity. Since there are one-hundred recording fields 18a, each with a storage capability of one million binary bits, the exemplary 1.5 by 1.5 inch recording medium 18 shown in FIG. 3 is capable of storing 100 million binary bits. Suitable positioning means 40 (FIG. 1) may be provided for positioning the recording medium 18 in the directions indicated by arrows E and F so as to permit recording data in each of the recording fields 18a (FIGS. 2 and 3).

To obtain read-out of the binary data recorded in a recording field 18a (FIGS. 2 and 3), the same reduced spot which scanned the field to produce the recording can also be used for read-out, with the exception that the output energy of the laser 1 is reduced to the point where it will not affect the medium 18. Alternatively, a different laser could be employed for read-out having a wavelength chosen so that the medium 18 is sufficiently less responsive thereto so as to be unaffected.

In either case, read-out lens 22 is provided on the opposite side of the medium 18 for receiving any light passing therethrough and for focusing the exit pupil of lens 17 onto photocell 42, via beam splitter 41, so as to minimize scanning action at the photocell aperture. It will be understood that a recorded spot, such as 19a in FIG. 3, could typically be relatively transparent with respect to unrecorded portions of the medium so as to permit a substantial portion of light to pass therethrough when the scanning spot is incident thereon. The light impinging on photocell 42 will, thus, be modulated in accordance with the binary data being scanned. Thus, to read out the data stored in a recording field, positioning means 40 (FIG. 1) is first positioned to the desired field 18a (FIGS. 2 and 3); the thus located field is then scanned is just described, and the output of photocell 42 is detected to obtain the recorded information.

Figure 4:
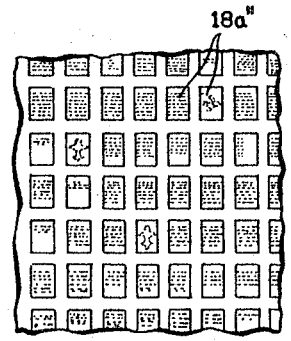
FIG. 4 is an enlarged fragmentary view of FIG. 2 illustrating a plurality of recording fields having printed and pictorial data recorded therein.

It will also be understood that, instead of recording binary digital data in the recording fields 18a, pictorial, printed, or other data may be recorded so as to form a large plurality of high resolution microimages, as illustrated in FIG. 4, each microimage 18a" having a reduction ratio of typically greater than 100 to 1. Such a microimage 18a" recorded in a field of medium 18 may be displayed, as illustrated in FIG. 1, by providing an illumination light source 19 which is applied via condenser lenses 20, beam splitter 16 and recording lens 17 to illuminate the desired microimage 18a". Light passing through the thus illuminated microimage 18a" is received by lens 22, which for this application is a high quality, flat-field, projection lens, for projecting the selected recording field 18a" onto a suitable viewing screen 23. The microimages produced by this process may also be reviewed externally by means of a reader such as is described in U.S. Patent 3,267,801.

It will further be understood that the system shown in FIG. 1 can also be used as a real-time display by permitting auxiliary light source 19 to project the data recorded on medium 18 while it is being recorded. Still further, by eliminating the oscillation of polygon 13 about axis B, and by operating positioning means 40 so that recording medium 18 is continually moving either up or down, a real-time oscillograph or facsimile is readily provided.

Returning now to a consideration of beam 2b at the output of beam splitter 3 in FIG. 1, it is initially to be understood that beam 2b is provided where it is desired to record pictorial, printed, or other information directly from a full size object or document 30. The optical components to which beam 2b is first applied, namely shutter 5, spot forming lens 25, mirror 26, relay lens 28, polygon 13 and field lens 24 function in the same manner as their counterparts 4, 9, 10, 12 and 14 in the previously described recording portion of the system. Consequently, as occurred for field lens 14 in the recording portion, a two-dimensional scanning pattern of focused spots is formed at field lens 24 by the simultaneously rotating and oscillating motion of polygon 13. Also, as in the recording portion, and for the same reason, field lens 24 is designed and located so as to form an image of the spot incident on polygon 13 at the entrance pupil of a high quality flat-field scanning lens 29. Scanning lens 29 is chosen to be of sufficiently high numerical aperture so as to resolve the spots formed at field lens 24.

Scanning lens 29 magnifies the two-dimensional scanning pattern at field lens 24, and images the pattern onto a full-size document 30 (e.g. 8½ by 11 inches) containing the pictorial or printed data which it is desired to record in highly reduced form on medium 18. It will be understood that, since the laser beams used for scanning and recording are reflected from opposite sides of polygon 13, synchronization of the two beams is automatic.

A photocell 38 is disposed with respect to document 30 to receive scattered light reflected therefrom so that the electrical output of photocell 38 will correspond to the variations in the density of the information encountered by the scanning spot as it scans the document 30. The electrical ouput of photocell 38 is suitably amplified and shaped and then applied to modulator 6 to cause amplitude modulation of the recording laser beam 2a, whereby the intensity of the energy content of the highly reduced spot incident on the recording medium 18 will vary in correspondence with the data scanned on document 30 to thereby record the document in the selected recording field 18a (FIG. 2) of the medium 18. To record another document, the medium 18 need merely be indexed to the next recording field 18a. Suitable indexing means are disclosed, for example, in U.S. Patent 3,260,153. In order to permit the above-described scanning of the document 30 to be performed under daylight conditions, it is desirable to provide a very narrow band pass filter centered at the laser wavelength at the input to photocell 38.

It will be appreciated that a highly significant advantage of the microimage scanning and recording system just described is that a full size document may be directly reduced to a high resolution microimage having a reduction ratio of typically greater than 100 to 1 without requiring any intermediate reduction steps as was heretofore required in the prior art (for example, see Patent No. 3,185,026). A particularly advantageous application of such a system is in the making of masks for highly miniaturized integrated or printed circuits, in which case the document 30 would contain the desired masking information, and with the system of FIG. 1 could then be recorded directly on medium 18 without any intermediate steps.

A particularly advantageous simplified embodiment of the invention is illustrated in FIG. 5 which has been drawn in the nature of a side view, rather than in the pictorial form of FIG. 1, so that the plane of the drawing is the common plane for the one axis laser beams. Like numerals and letters designate like elements in FIGS. 1 and 5, and new elements have been given 100 level numerical designations.

It will be seen from a comparison of FIGS. 1 and 5 that the system of FIG. 5 eliminates all of the optical components in the scanning portion of the system of FIG. 1 up to and including field lens 24. To permit this simplification, the amplitude modulator 6 in FIG. 1 comprising the combination of a Pockels cell for rotating the plane of polarization in response to an applied electrical signal and an analyzer for converting the change in polarization to an amplitude modulation, is not used as such in FIG. 5. Instead, only the Pockels cell is employed, as indicated by the numeral 106 in FIG. 5, so that there is no amplitude modulation of the laser beam, but only a varying rotational change in the polarization thereof in response to the signal applied to the Pockels cell 106, thereby permitting the same laser beam to be used for both the scanning and recording beam up to and including field lens 14. It is only after passing field lens 14 that the laser beam 2 in FIG. 5 is divided into recording and scanning beams 2a and 2b by beam splitter 3, which may be moved from its position in FIG. 1 to an appropriate position beyond field lens 14 for this purpose, as shown in FIG. 5.

Still referring to the simplified system of FIG. 5, the recording laser beam 2a at the output of beam splitter 3 in FIG. 5 follows a like optical component path as in FIG. 1 with the addition of analyzer 116, which is provided for converting the rotational polarization variations of the recording beam 2a into an amplitude modulation. The scanning laser beam 2b at the output of beam splitter 3 in FIG. 5 is focused by scanning lens 29 to produce the same two-dimensional spot scanning pattern on document 30 as in FIG. 1, except that it will contain the rotational polarization variations introduced by polarization rotator 106. However, this will cause no problem, since photocell 38 responds only to amplitude fluctuations in the scattered light and will, therefore, completely ignore polarization variations. It will also be understood that, since the laser beam 2 is not divided into recording and scanning beams 2a and 2b until after relay lens 14, perfect synchronization between the two is automatically obtained.

Figure 6:
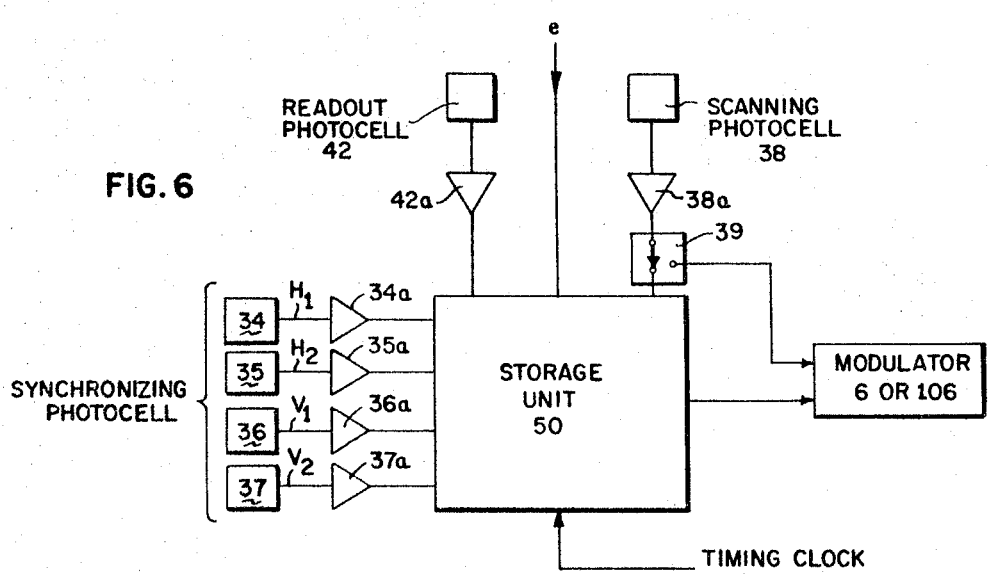
FIG. 6 is a block diagram illustrating typical associated electrical means for use with the systems of FIGS. 1 and 5.

Referring now to FIG. 6, illustrated therein is a block diagram of a typical electrical implementation for the system of FIGS. 1 and 5. Each of photocells 34, 35, 36, 37, 38 and 42 is provided with a respective one of amplifier and shapers 34a, 35a, 36a, 37a, 38a and 42a for appropriately amplifying and shaping and/or digitizing the signals produced thereby prior to application to a storage unit 50, which may be of conventional form to receive digital or analog data, or both. It will be understood that storage unit 50 may receive signals from read-out photocell 42 or scanning photocell 38, or from some external source e, for storage at appropriate locations therein in response to the vertical and horizontal synchronizing signals $H_1$, $H_2$, $V_1$ and $V_2$. Once stored, these signals may at a later time be read out of the storage unit and applied to modulator 6 (FIG. 1) or 106 (FIG. 5) for recording on medium 18 (FIGS. 1 and 2), in which case synchronization is obtained using synchronizing signals $H_1$, $H_2$, $V_1$ and $V_2$ in conjunction with a timing clock whose repetition rate corresponds to the row scanning speed of the recording spot incident on medium 18 (FIG. 1). The timing clock and synchronization might also be obtained from the use of a magnetic or photographic disk or drum mounted on the same shaft as the polygon.

As also shown in FIG. 6, switch 39 is provided to permit the signals produced by scanning photocell 38 to be applied to storage unit 50, or directly to modulator 6 or 106, in which case synchronizing signals are not required, since the use of the same scanning polygon makes synchronization automatic.

Now considering the recording medium 18 in the system of FIGS. 1 and 5, it is to be understood that because the present invention makes it possible to convert substantially the entire output of a laser into a highly reduced, controllably scannable spot of 2 microns or less, the spot contains sufficient laser energy to effect a wide variety of changes in appropriately chosen materials for the recording medium 18. In other words, not only can photosensitive materials (e.g. silver halide) and other low energy responsive materials (e.g. photochromic materials) be used for the recording medium 18, but also, relatively high energy responsive materials can be used for medium 18 having desirable characteristics not present in the low energy responsive materials. For example, silver halides require the formation of a latent image, and photochromic and other direct recording materials, although not requiring the formation of a latent image, are unstable in normal environments and/or result in destruction of the recorded information upon read-out, and/or require special and delicate handling to protect the recorded information, and/or do not provide a high resolution recording capability.

In an application in which the disadvantages of a particular low energy responsive recording material is tolerable, its use as the recording medium in the present invention (if capable of the desired resolution) permits an unusually high recording speed to be obtained, because of the high laser energy content of the recording spot. In applications where it is desirable to avoid the disadvantages of these low energy responsive materials, the high laser energy content of the recording spot achieved by the present invention permits the use of highly stable, high resolution recording mediums which are not affected by normal environments, and which permit read-out of the recorded information without destruction thereof. The general characteristics and requirements of such materials will now be considered and a number of specific examples given.

A wide variety of materials, including dye containing coatings and vacuum deposited or sputtered films are available for use as the recording film 51 (FIG. 7), depending upon the application and the nature of the change in the recording film which it is desired that the laser recording spot produce. For best system efficiency, the recording film 51 should have high absorption at the laser wavelength. The changes in the recording film 51 producible by the high energy laser recording spot may be chemical, such as a color change, or physical, such as deformation, plastic flow, vaporization, or evaporation, or combinations of both.

Figure 7:
FIG. 7 is a fragmentary cross-sectional view of a typical recording medium.

It has been found that the thickness of the recording medium is an important factor; a thickness of 10 microns or less for coated films is particularly advantageous, while a range of 200–2000 angstroms for vacuum deposited films is preferable. As illustrated in FIG. 7, such a thin recording film 51 is typically formed on a suitable supporting substrate 52, which is preferably transparent at the laser wavelength. The substrate 52 may be a rigid material, such as glass, or a flexible substrate, such as a film based on polyethylene terephthalate, such as that available as Type D Mylar from Du Pont de Nemours.

A first example of a recording medium may be provided by first preparing a solution containing 1% by weight of a triphenyl methane dye, 5% by weight of cellulose nitrate, 47% by weight of butyl acetate, and 47% by weight of ethanol. Using a coating bar technique, a wet film of 40 microns thickness is deposited on a glass substrate. After evaporation of the solvents (butyl acetate and ethanol), the dry clear film remaining on the glass is approximately 2 microns thick and consists of 16.6% dye and 83.4% cellulose nitrate binder with an optical density of 1.1 at a wavelength of 6328 A. Each recorded spot consists of a colorless circle in a blue background. The decolorization of the dye is considered to be the result of its chemical decomposition, expedited by the reaction between the dye molecules and the decomposition products of the binder.

A second example of a recording medium may be provided by depositing a 500 angstrom film of tin on a glass substrate using standard vacuum deposition equipment. Each recorded spot consists of a colorless circle in an otherwise dense tin film background, and is considered to be the result of evaporation of the metal.

A third example of a recording medium may be provided using a vacuum sputtering technique to deposit a 500 angstrom film of tantalum onto a glass substrate. Each recorded spot consists of a colorless circle in the dense tantalum film background, and is considered to be the result of evaporation of the metal.

Using a recording medium of a type such as described in the first example with a recording system similar to FIGURE 1, and with the Spectra-Physics Model 125 laser, it was found possible to record microimages at raster line writing rates of greater than one million spot diameters per second, i.e. less than 1500 microseconds for a raster line containing 1500 resolvable picture elements. While recording on the third exemplary material, tantalum, is very slow with the laser specified above, higher power lasers, such as an argon ion laser, or continuous wave solid state lasers, such as ruby or neodymium doped, yttrium aluminum garnet, provide powers greater than one watt output, and are sufficient in power to achieve practical data recording rates with materials of this type.

The first exemplary recording medium, which uses a dye, is particularly useful for micro circuit mask making as well as for microimage recording and reproducing, since it has a high resolution capability and a threshold characteristic which tends to compensate for small changes in recording spot focus. The third exemplary recording medium, which employs tantalum, is particularly useful (especially with higher power lasers) for making highly miniaturized printed or integrated circuits, since the tantalum may itself be used as a circuit material, for example for resistors.

We claim:

1. An optical recording system comprising: a source of collimated, monochromatic, coherent radiation for producing a beam of light; a recording medium; first, second and third lenses to which said beam is applied, said lenses being constructed and arranged to produce a focused spot at the second lens and to image the focused spot via said third lens onto said recording medium; and means interposed prior to said third lens for causing amplitude modulation and scanning of the light beam, including means located between said first and second lenses operable to permit a two-dimensional deflection of the focused spot at said second lens which is imaged onto said recording medium by said third lens.

2. In a laser recording system, means for producing a laser beam, first, second and third lenses to which said laser beam is applied, said third lens having an entrance pupil, a recording medium, said lenses being constructed and arranged to produce a focused spot at the second lens and to image the focused spot produced at said second lens via said third lens onto said recording medium, amplitude modulating means interposed prior to said third lens for causing amplitude modulation of the laser beam, and means interposed prior to said third lens for causing deflection of the focused spot being imaged via the third lens onto said recording medium while maintaining a substantially stationary beam spot in size and position at the entrance pupil of said third lens.

3. The invention in accordance with claim 2, wherein said recording medium comprises a substrate having a thin film thereon of less than 10 microns, said film having absorbency at the laser beam wavelength.

4. The invention in accordance with claim 3, wherein said recording medium comprises a transparent substrate having a vacuum deposited film of 200 to 2,000 angstroms.

5. The invention in accordance with claim 4, wherein said film is tantalum.

6. The invention in accordance with claim 3, wherein said film is a triphenyl methane dye with a cellulose nitrate binder.

7. The invention in accordance with claim 6, wherein said film consists of approximately 16.6% triphenyl methane dye and 83.4% cellulose nitrate.

8. In a laser recording system: means for producing a laser beam; a recording medium; first, second and third lenses to which said laser beam is applied, said lenses being constructed and arranged to produce a focused spot at the second lens and to image the focused spot via said third lens onto said recording medium; and means interposed prior to said third lens for causing amplitude modulation and scanning of the laser beam, including means located between said first and second lenses so as to produce a two-dimensional focused spot scanning pattern at said second lens which is imaged onto said recording medium by said third lens.

9. The invention in accordance with claim 8, wherein said scanning means includes a moving mirror located to receive the laser beam from said first lens for reflection to said second lens, wherein said third lens is a compound lens having an entrance pupil, and wherein said second lens is constructed and arranged to form an image of the spot incident on said mirror at the entrance pupil of said third lens.

10. The invention in accordance with claim 8, wherein said scanning means is a simultaneously rotating and oscillating mirrored polygon located so that the beam from the first lens is directed toward the intersection of the axes about which the polygon rotates and oscillates, the diameter of the circle circumscribing the said polygon being chosen to be approximately four times the separation between said second lens and the mirrored surface of said polygon when normal to the optical axis.

11. The invention in accordance with claim 8, wherein said means interposed prior to said third lens also includes amplitude modulating means comprising means for rotating the plane of polarization of the laser beam in response to an applied electrical signal, and means for converting the rotational polarization variations into amplitude modulation of the laser beam.

12. The invention in accordance with claim 11, wherein said means for rotating the plane of polarization is located prior to said scanning means and said means for converting is located after said scanning means.

13. In a laser recording system, means for producing a laser beam, a recording medium, first, second and third lenses to which said laser beam is applied, said lenses being constructed and arranged to produce a focused spot at the second lens and to image the focused spot produced at the second lens onto said recording medium which produces a detectable change in response thereto, scanning means interposed between the first and third lenses for producing a two-dimensional focused spot scanning pattern at said second lens which is imaged onto said recording medium by said third lens, amplitude modulating means located prior to said third lens for amplitude modulating the laser beam in response to an applied electrical signal, means located prior to said third lens for deriving a scanning laser beam having a scanning pattern synchronized with that produced at said second lens, means for imaging said scanning beam onto the data to be recorded, means for detecting intensity variations in said data as said scanning beam scans, and means cooperating with said means for detecting for applying a representative electrical signal to said amplitude modulating means so as to cause said data to be recorded on said medium.

14. The invention in accordance with claim 13, wherein said lenses provide a reduction ratio of 100 to 1 or greater between the data to be recorded and the resultant data recorded on said medium.

15. The invention in accordance with claim 13, wherein said scanning means includes a plurality of moving mirrors located to receive the laser beam from said first lens for reflection to said second lens, wherein said third lens is a compound lens having an entrance pupil, and wherein said second lens is constructed and arranged to form an image of the spot incident on said mirror at the entrance pupil of said third lens.

16. The invention in accordance with claim 13, wherein said means for deriving a scanning beam is located prior to said amplitude modulating means and said scanning means.

17. The invention in accordance with claim 13, wherein said amplitude modulating means comprises means for rotating the plane of polarization of the laser beam in response to said electrical signal and means for converting the rotational polarization variations into amplitude modulation of the laser beam, and wherein said means for deriving a scanning beam is located after said scanning means and said means for rotating the plane of polarization but before said means for converting the rotational polarization.

18. The invention in accordance with claim 17, wherein said scanning means is a simultaneously rotating and oscillating mirrored polygon located so that the beam from the first lens is directed toward the intersection of the axes about which the polygon rotates and oscillates, the diameter of the circle circumscribing the said polygon being chosen to be approximately four times the separation between said second lens and the mirrored surface of said polygon when normal to the optical axis.

19. The invention in accordance with claim 18, wherein said recording medium exhibits a detectable change without requiring the formation of a latent image in response to an incident laser beam of at least a predetermined power per unit area at a wavelength for which said medium has high absorption, and wherein the laser beam produced by said first mentioned means has a power per unit area insufficient to cause said detectable change.

20. In a laser recording and reproducing system means for producing a laser beam, first, second and third lenses to which said laser beam is applied, said third lens having an entrance pupil, a recording medium, said lenses being constructed and arranged to produce a focused spot at the second lens and to image the focused spot produced at said second lens via said third lens onto said recording medium which produces a detectable change in response thereto without requiring the formation of a latent image, amplitude modulating means interposed prior to said third lens for causing amplitude modulation of the laser beam, means interposed prior to said third lens for causing deflection of the focused spot being imaged via the third lens onto said recording medium while maintaining a substantially stationary beam spot in size and position at the entrance pupil of said third lens, and readout means for reading out data recorded on said medium.

21. The invention in accordance with claim 20, wherein said read-out means includes means for displaying data recorded on said medium.

22. The invention in accordance with claim 21, wherein said lenses provide a reduction of at least 100 to 1, and wherein said means for displaying includes optical means for magnifying the recorded data to humanly visible form.

23. In a laser recording and reproducing system, means for producing a laser beam, first, second and third lenses to which said laser beam is applied, a recording medium, said lenses being constructed and arranged to produce a focused spot at the second lens and to image the focused spot produced at said second lens via said third lens onto said recording medium which produces a detectable change in response thereto without requiring the formation of a latent image, means interposed prior to said third lens for causing amplitude modulation and scanning of the laser beam, said scanning means including a moving mirror located to receive the laser beam from said first lens for reflection to said second lens, said third lens being a compound lens having an entrance pupil, and said second lens being constructed and arranged to form an image of the spot incident on said mirror at the entrance pupil of said third lens, and read-out means for reading out data recorded on said medium.

24. In a laser read-out system comprising: means for producing a laser beam, first, second and third lenses to which said laser beam is applied, said third lens having an entrance pupil, a medium having data recorded thereon, said lenses being constructed and arranged to produce a focused spot at the second lens and to image the focused spot produced at said second lens via said third lens onto said recording medium, means interposed prior to said third lens for causing scanning of the laser beam being imaged via the third lens onto said recording medium while maintaining a substantially stationary beam spot in size and position at the entrance pupil of said third lens, and photosensitive means arranged and located with respect to said recording medium to respond to the interaction between data recorded thereon and the scanning laser beam, said medium being chosen so that the data thereon will not be destroyed by the incident laser beam.

25. A laser read-out system comprising: means for producing a laser beam; a medium having data recorded thereon, said medium being chosen so that the data thereon will not be destroyed by an incident laser beam; first, second and third lenses to which said laser beam is applied, said lenses being constructed and arranged to produce a focused spot at the second lens and to image the focused spot produced at the second lens via said third lens onto said recording medium; and means interposed between the first and second lenses so as to produce a two-dimensional focused spot scanning pattern at said second lens which is imaged onto said medium by said third lens; and photosensitive means arranged and located with respect to said recording medium to respond to the interaction between data recorded thereon and the scanning laser beam.

26. The invention in accordance with claim 25, wherein said scanning means includes a moving mirror located to receive the laser beam from said first lens for reflection to said second lens, wherein said third lens is a compound lens having an entrance pupil, and wherein said second lens is constructed and arranged to form an image of the spot incident on said mirror at the entrance pupil of said third lens.

27. The invention in accordance with claim 25, wherein said scanning means is a simultaneously rotating and oscillating mirrored polygon located so that the beam from the first lens is directed toward the intersection of the axes about which the polygon rotates and oscillates, the diameter of the circle circumscribing the said polygon being chosen to be approximately four times the separation between said second lens and the mirrored surface of said polygon when normal to the optical axis.

References Cited

UNITED STATES PATENTS

| | | | |
|---|---|---|---|
| 3,144,637 | 8/1964 | Adams et al. | 346—108 X |
| 3,181,170 | 4/1965 | Akin | 346—108 |
| 3,266,393 | 8/1966 | Chitayat | 95—11 |
| 3,287,736 | 11/1966 | Germer | 346—108 X |
| 3,314,073 | 4/1967 | Becker | 346—76 |
| 3,316,348 | 4/1967 | Hufnagel et al. | 178—6.7 |

RICHARD B. WILKINSON, Primary Examiner

JOSEPH W. HARTARY, Assistant Examiner

U.S. Cl. X.R.

178—6.6; 331—94.5; 340—173; 346—108